(12) United States Patent
Gershtein et al.

(10) Patent No.: US 9,346,010 B2
(45) Date of Patent: May 24, 2016

(54) SHIELDING IN A SEPARATION COLUMN (75) Inventors: Vladimir Yliy Gershtein, Allentown, PA (US); Patrick Alan Houghton, Emmaus, PA (US); Kenneth William Kovak, Macungie, PA (US); Andrew Weaver, Surrey (GB); Jonathan Wilson, Chesire (GB)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 14/007,869

(22) PCT Filed: Mar. 31, 2011

(86) PCT No.: PCT/US2011/030641
§ 371 (c)(1),
(2), (4) Date: Sep. 26, 2013

(87) PCT Pub. No.: WO2012/134470
PCT Pub. Date: Oct. 4, 2012

(65) Prior Publication Data
US 2014/0013946 A1    Jan. 16, 2014

(51) Int. Cl.
*B01D 47/00*   (2006.01)
*B01D 53/18*   (2006.01)
*B01D 3/00*    (2006.01)
*F25J 3/04*    (2006.01)

(52) U.S. Cl.
CPC .............. *B01D 53/185* (2013.01); *B01D 3/008* (2013.01); *F25J 3/04909* (2013.01); *F25J 3/04927* (2013.01); *F25J 2290/20* (2013.01)

(58) Field of Classification Search
None
See application file for complete search history.

(56) References Cited

U.S. PATENT DOCUMENTS

| 4,427,605 A | * | 1/1984 | Meier et al. ................... 261/97 |
| 4,432,913 A | | 2/1984 | Harper et al. |
| 4,855,089 A | * | 8/1989 | Michels ........................ 261/97 |

(Continued)

FOREIGN PATENT DOCUMENTS

| CN | 1256167 | 6/2000 |
| EP | 0282753 A1 | 9/1988 |

(Continued)

OTHER PUBLICATIONS

European Patent Office, International Search Report and Written Opinion of the International Searching Authority, mailed Nov. 29, 2011, for PCT/US2011/030641.

*Primary Examiner* — Duane Smith
*Assistant Examiner* — Adam Bergfelder
(74) *Attorney, Agent, or Firm* — Eric J. Schaal (57) ABSTRACT

A liquid distributor and method for distribution of a liquid in a mass transfer column, the distributor includes at least one riser comprising at least one riser wall, the at least one riser wall extends from a first surface of the distributor in a first direction of the mass transfer column; at least one shield, the at least one shield extends from a second surface of the distributor opposite the first surface and extending in a second direction opposite the first direction; and at least one liquid distribution aperture extending from the first surface of the distributor through the second surface of the distributor, the at least one shield has a length extending in the second direction such that a gap is created between the at least one shield and a packing, the height of the gap between the shield and the packing is about 10 mm to 75 mm.

8 Claims, 8 Drawing Sheets

(56) References Cited

U.S. PATENT DOCUMENTS

| | | | |
|---|---|---|---|
| 6,059,272 A * | 5/2000 | Potthoff et al. | 261/97 |
| 6,395,138 B1 * | 5/2002 | Darredeau et al. | 202/158 |
| 6,575,437 B2 | 6/2003 | Fischer et al. | |
| 6,866,778 B2 | 3/2005 | Kerschenmeyer et al. | |
| 2002/0041040 A1 * | 4/2002 | Fischer et al. | 261/98 |
| 2002/0158350 A1 | 10/2002 | Ender et al. | |
| 2007/0181213 A1 * | 8/2007 | Bachmann et al. | 141/234 |

FOREIGN PATENT DOCUMENTS

| | | |
|---|---|---|
| EP | 1013324 A2 | 6/2000 |
| EP | 1813347 A1 | 8/2007 |
| GB | 2062489 A | 5/1981 |
| RU | 2282479 C2 | 8/2006 |
| SU | 174170 A1 | 8/1965 |
| SU | 179272 A1 | 2/1966 |
| TW | 436312 | 5/2001 |

* cited by examiner

SHIELDING IN A SEPARATION COLUMN

BACKGROUND

To achieve high efficiencies in mass transfer columns (e.g., air separation columns), it is well established that uniform liquid distribution in a packing bed is critical. Uniform liquid distribution leads to efficient mass transfer in the packing bed. Thus, it became the industry standard to design mass transfer columns and devices to promote uniform liquid distribution.

Figure 1:
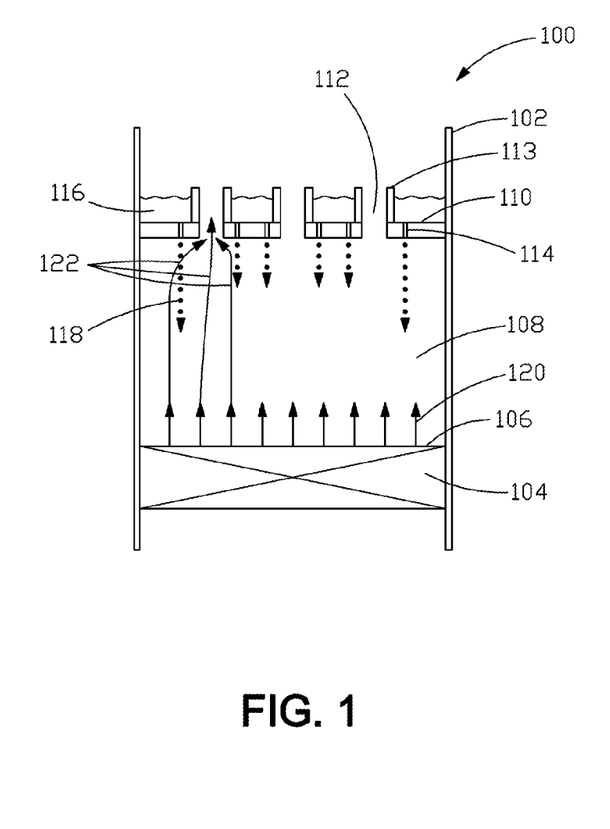
FIG. 1 is a cross-sectional view of a traditional mass transfer column section.

For exemplary purposes, a traditional mass transfer column section 100 is illustrated in FIG. 1 that uses countercurrent flow of a liquid and a vapor for mass transfer. The liquid falls down the mass transfer column as a result of gravity and the vapor rises up the mass transfer column as a result of an established pressure gradient along the length of the column section. The result is that mass transfer takes place inside the column.

A typical mass transfer column, such as an air separation column, is divided into a number of zones or sections 102 where each zone or section 102 is bounded by a mass transfer device such as, for example, a packing bed or packing 104, from the bottom and a liquid distributor 110, for example, from the top. Between the packing 104 and the distributor 110 is a space or spacing 108 between the bottom surface 126 of the liquid distributor 110 and the top surface 106 of the packing 104 where vapor 120 ascends upward from the packing 104 and liquid 116 falls freely downward from the liquid distributor 110.

A typical liquid distributor 110 contains both vapor and liquid passages for vapor and liquid collection and distribution. The vapor passages are used for the ascending vapor 120 to pass through the liquid distributor 110 into the next column section (not shown). Liquid collectors (not shown) are located on the top of the liquid distributor 110. The liquid collector and liquid distributor 110 are typically designed to maintain a desired level of liquid 116 and to provide a desired, usually even, liquid distribution across the surface of the liquid distributor 110 and, therefore, across the column cross-sectional area. The purpose of the liquid distributor 110 is to distribute the liquid 116 uniformly on the packing surface 106. A series of liquid distribution apertures or holes 114 are placed in the liquid distributor 110 for the liquid 116 to pass through under hydrostatic pressure. The liquid distribution apertures or holes 114 may be of equal or different diameters depending on the mass transfer column size, specific zone or section design, position on the liquid distributor surface, etc. In addition, the liquid distribution apertures or holes 114 may be organized in regular or irregular arrays. The liquid distribution apertures or holes 114 may be placed at the bottom of the distributor body or at the trough vertical walls, etc.

Liquid streams of droplets 118 form after passing through the liquid distribution apertures or holes 114 of the liquid distributor 110 and the streams of droplets 118 fall from the liquid distributor 110 through the spacing 108 creating streams of droplets 118 or liquid streams. In general, the liquid streams or droplets 118 created may vary in size and may have different initial velocities. The droplet sizes are defined by the diameter of the liquid distribution apertures or holes 114, by the liquid initial velocity, and by the liquid physical properties (density, viscosity, etc.). The liquid initial velocity is defined by the number of liquid distribution apertures or holes 114, the diameter of the liquid distribution apertures or holes 114, and the level of the liquid 116 above the liquid distributor 110. The droplets 118 fall down freely against the ascending vapor 120 in the spacing 108.

The packing or packing bed 104 is designed to accept the liquid 116 from the liquid distributor 110 and to distribute the ascending vapor stream 120 evenly across the column cross section 102. Therefore, one may assume that the ascending vapor 120 ascends evenly up to the liquid distributor 110 where it shall split into a series of streams penetrating the open areas, called riser areas, riser apertures, or risers 112 hereinafter, organized across the surface of the liquid distributor 110. Riser walls 113 prevent liquid collected in the liquid distributor 110 from flowing downwardly through the risers 112.

Figure 2:
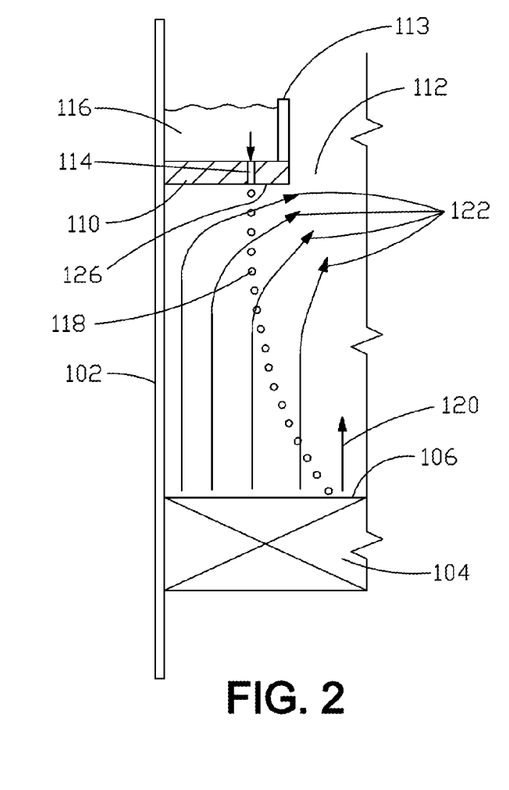
FIG. 2 is a sectional view of the traditional mass transfer column section of FIG. 1.

The split of the ascending vapor 120 into a series of streams may not be uniform, however, and depends primarily on the open area, geometry, and position of the risers 112. As illustrated in FIG. 2, as the vapor streams 120 ascend through the spacing 108, the vapor streams 120 begin to accelerate and turn towards the open area of the risers 112 where the vapor streams 120 may escape into the next column section, for example. These turning vapor streams 122 create a force directed towards the center of the open area of the risers 112 and on the falling liquid streams or droplets 118. In the traditional column section 102, the falling liquid or droplet 118 may experience the impact of the force produced by the ascending turning vapor streams 122 the moment the droplet 118 exits the liquid distributor 110 into the spacing 108. The interaction between turning vapor stream 122 and the falling droplets 118 influences the intended trajectory of the falling droplets 118 (i.e., through deflection of the falling droplets 118). Any significant change from the intended trajectory of the falling droplets 118, and thus, the droplets' 118 intended target(s) on the packing surface 106, may lead to maldistribution and poor performance of the mass transfer column section 100.

The force acting on the droplets may be different in the vicinity of different risers since the vapor stream may split differently as mentioned above. Typically, the ascending vapor begins its split into different streams in the space between the top of the packing surface and the underside of the liquid distributor (i.e. the spacing). A droplet trajectory will depend on the droplet mass, its initial velocity, the position of the liquid distribution apertures or holes relative to the riser edge, and the droplet affected residence time (i.e., the time when the droplet 118 is in the spacing 108 under the influence of the force from the turning vapor stream 122).

Significant deflection of the droplet may occur from a desired fall position if the droplet is experiencing a force from the turning vapor stream at the very top of the spacing and/or if the droplet forms at the liquid distribution aperture or hole positioned close to the riser edge. Further, as vapor and liquid throughput is increased in the mass transfer column, liquid droplet deflection will increase.

There are several ways to minimize liquid deflection in the mass transfer column. The first way to minimize liquid deflection in the mass transfer column is to minimize the spacing 108 between the bottom surface 126 of the liquid distributor 110 and the top surface 106 of the packing 104. Having a smaller spacing results in a shorter affected droplet residence time (ADRT) of the falling liquid in that spacing and, therefore, may result in less overall liquid deflection from the desired fall position at the packing surface. The affected droplet residence time (ADRT) is calculated by dividing the spacing where the droplets are affected by the turning vapors streams ($H_{AFFECTED}$) by the average droplet velocity ($V_{AVEDROPLET}$) or:

$$ADRT = H_{AFFECTED}/V_{AVEDROPLET}.$$

Unfortunately, minimizing the spacing often has limits due to a variety of different factors related to fabrication of the mass transfer devices and liquid distributors.

Figure 3:
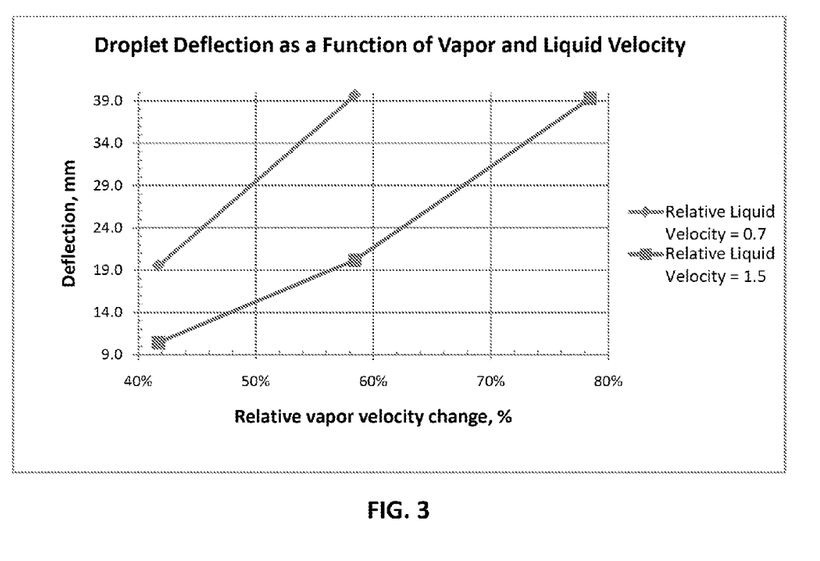
FIG. 3 is a graphical representation illustrating droplet deflections as a function of vapor and liquid velocities.

A second way to minimize liquid deflection in the mass transfer column is to reduce the vapor flow rate. This option may greatly impact the force deflecting the liquid streams as shown in FIG. 3, however, this option may not be desirable, especially when products of separation are of great demand and the mass transfer column is forced to operate at its maximum capacity.

A third way to minimize liquid deflection in the mass transfer column is to reduce the ascending vapor velocity inside the riser by increasing the riser open area while keeping the vapor flow rate constant. This approach utilizes less space for horizontal liquid flow resulting in narrower liquid troughs with higher liquid velocities in the troughs and, therefore, may impact liquid distribution at the top of the liquid distributor. Poor liquid distribution in the distributor troughs will make liquid maldistribution even worse at the packing surface. In addition, narrower troughs may demand positioning the rows of liquid distribution apertures or holes closer to the edges of the riser. Such positioning of the liquid distribution apertures or holes may lead to an increased liquid stream deflection and, therefore, may result in even greater liquid maldistribution on the packing surface.

A fourth way to minimize liquid deflection in the mass transfer column is to increase the droplet size of the liquid and to increase the liquid droplet initial velocity. These two approaches are interdependent. Indeed, an increase in the droplet size requires larger diameter liquid distribution apertures or holes, which by itself may reduce the liquid level above the liquid distributor, thereby leading to reduced initial droplet velocity in the spacing. While it is possible to increase the size of the liquid distribution apertures or holes and keep the liquid level above the liquid distributor constant by reducing the number of liquid distribution apertures or holes 114 on the liquid distributor 110, this may lead to a liquid distributor design with too few aperture or holes 114, which by itself may impact the uniformity of liquid distribution on the packing surface and the overall efficiency of the mass transfer column. A simple increase in the liquid level to increase initial liquid velocity may influence the column design (i.e., forcing an increase in column height). Typically, this option is also undesirable in most cases.

Traditional liquid distributor designs may be found in, for example, the following publications: U.S. Pat. Nos. 6,293,526; 6,059,272; 6,395,139; 5,785,900; 5,132,055; 5,868,970; 6,086,055; EP 0972551; and WO 02/083260.

Disclosure and discussion of the problems associated with uniform liquid distribution on the mass transfer device surface or so called packing surface are somewhat limited. This may be because of the well-known, but incorrect, assumption or belief that if a liquid is distributed uniformly at the point where liquid leaves the liquid distributor, the liquid will be distributed uniformly on the surface of a mass transfer device or packing. It is customary to assume that the uniform distribution of the holes on the liquid distributor provides the same uniform liquid distribution at the mass transfer device surface, (i.e., where the liquid entered the packing surface).

For example, disclosure of different aperture dimensions and their suggested positions can be found in prior publications. For example, U.S. Pat. No. 6,293,526 suggests an arrangement of screens placed in front of the liquid distribution apertures through which liquid discharges from the distributor. The screen design was suggested for the distributors with side liquid jets. Liquid jets impinge on the screens, or so-called baffles, and form a liquid layer of the jetted liquid on the baffle surfaces. The liquid layer slides down the baffle surface and drips onto the packing surface positioned below. U.S. Pat. No. 6,293,526 proposes a better baffle inclination angle that minimizes both liquid splashing and the amount of liquid droplets that may be carried upwards in the ascending vapor.

The ends of the suggested baffles of U.S. Pat. No. 6,293,526 are located in the vapor stagnation zone, thus, the baffle length is short and does not protrude far enough through the spacing between the distributor and the packing surface. The baffles of U.S. Pat. No. 6,293,526 are short because the inventors were only motivated to teach use of the suggested baffles to minimize the liquid splashing and formation of the thin liquid layer of the jetted liquid on the baffle surface and not to minimize liquid deflection as disclosed herein.

Thus, there is a need in the art for an improved column section design that permits sustaining performance in a mass transfer column at high production rates by minimizing liquid maldistribution on the packing surface and associated method of use. Such methods and design shall prevent droplet deflection in the spaces between liquid distributors and the packing surfaces for different column zones.

SUMMARY

The disclosed embodiments satisfy the need in the art by providing both a system and method to facilitate liquid distribution over a surface of mass transfer devices, in particular in air separation columns where uniform distribution of the falling liquid is critical and has a significant impact on the separation device's efficiency. Aspects of the present invention are applicable to all style distributors, but are particularly beneficial for trough style distributors and plate distributors, for example. Minimizing the liquid residence time in the zone where the liquid droplets are affected by the ascending vapor flow, and especially the turning vapor, helps to reduce the deflection of the droplets from their intended position on the mass transfer device.

In one embodiment a liquid distributor for distribution of a liquid in a mass transfer column is disclosed, comprising: at least one riser comprising at least one riser wall, wherein the at least one riser wall extends from a first surface of the liquid distributor in a first direction of the mass transfer column; at least one shield, wherein the at least one shield extends from a second surface of the liquid distributor opposite the first surface and extending in a second direction of the mass transfer column opposite the first direction; and at least one liquid distribution aperture extending from the first surface of the liquid distributor through the second surface of the liquid distributor, wherein the at least one shield has a length extending in the second direction such that a gap is created between the at least one shield and a packing, and wherein the height of the gap between the shield and the packing is about 10 mm to 75 mm.

In another embodiment, a method for the distribution of a liquid in a mass transfer column is disclosed, comprising the steps of: introducing the liquid into an upper portion of the mass transfer column; positioning within the mass transfer column at least one mass transfer column section; positioning within the at least one mass transfer column section a liquid distributor to receive a downwardly flowing stream of liquid and an upwardly flowing stream of vapor, the liquid distributor comprising: (i) at least one riser comprising at least one riser wall, wherein the at least one riser wall extends upwardly from a first surface of the liquid distributor; (ii) at least one shield, wherein the at least one shield extends from a second surface of the liquid distributor opposite the first surface and extending downwardly; and (iii) at least one liquid distribution aperture extending from the first surface of the liquid distributor through the second surface of the liquid distributor, wherein the at least one shield has a length extending downwardly such that a gap is created between the at least one shield and a packing positioned below the liquid distributor in the mass transfer column, and wherein the height of the gap between the shield and the packing is about 10 mm to 75 mm; collecting the downwardly flowing stream of liquid from the upper portion of the mass transfer column on the first surface of the liquid distributor; passing the upwardly flowing stream of vapor from the lower portion of the mass transfer column through the risers of the liquid distributor; and distributing the downwardly flowing stream of liquid from at least one liquid distribution aperture in the liquid distributor on to the packing.

BRIEF DESCRIPTION OF SEVERAL VIEWS OF THE DRAWINGS

The foregoing summary, as well as the following detailed description of exemplary embodiments, is better understood when read in conjunction with the appended drawings. For the purpose of illustrating embodiments, there is shown in the drawings exemplary constructions; however, the invention is not limited to the specific methods and instrumentalities disclosed. In the drawings.

DETAILED DESCRIPTION

Aspects of the current invention relate to liquid distribution over a surface of mass transfer devices, and in particular, for separation columns where uniform distribution of the falling liquid is critical and may impact the device efficiency significantly. In general, the disclosed aspects are applicable to all types of distributors, but are particularly beneficial for trough style and plate distributor designs. Aspects of the current invention are specifically useful for minimizing liquid maldistribution on the packing surface. Further, aspects of the current invention may be particularly useful when a high density hole pattern is used, for example, more than 200 holes per square meter of the mass transfer device area. Finally, aspects of the current invention may be particularly useful when high capacity packing is utilized and, therefore, high vapor flow rates in the mass transfer device are present.

Figure 4:
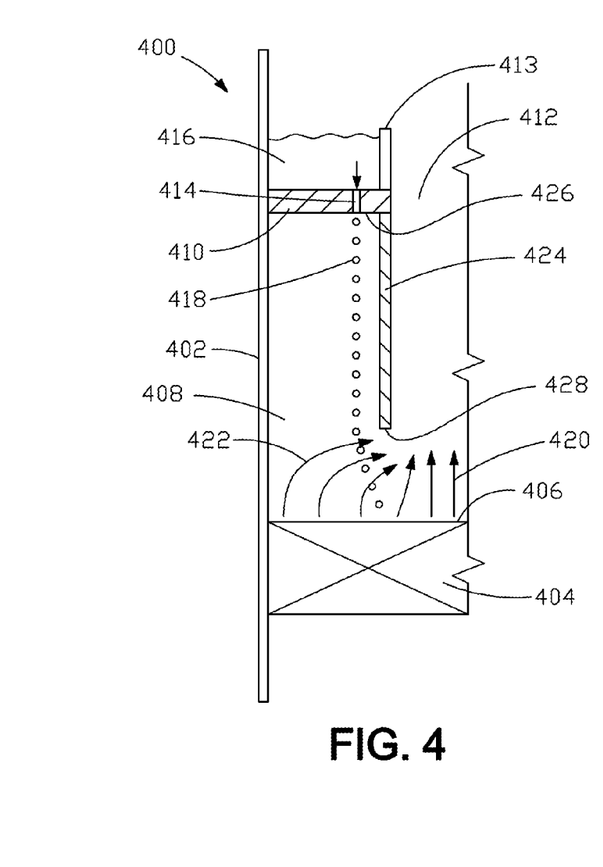
FIG. 4 is a sectional view of a mass transfer column section in accordance with one embodiment of the present invention.

FIG. 4 illustrates a sectional view of an exemplary mass transfer column section 400 in accordance with one embodiment of the current invention. The sectional view of the mass transfer column section 400 includes the outer wall of the mass transfer column 402. The mass transfer column section 400 is bounded by packing 404, from the bottom and a liquid distributor 410 from the top. Between the packing 404 and the liquid distributor 410 is a spacing 408 where vapor stream 420 ascends upward through the packing 404 and liquid 416 falls downward from the liquid distributor 410. Liquid collectors (not shown) may be located on the top of the liquid distributor 410. The liquid collector and liquid distributor 410 are typically designed to maintain a desired level of liquid 416 and to provide a desired, usually uniform, liquid distribution across the surface of the liquid distributor 410. A series of liquid distribution apertures or holes 414 are positioned in the liquid distributor 410 for the liquid 416 to pass through under hydrostatic pressure. The liquid distribution apertures or holes 414 may be of equal or different diameters depending on the mass transfer column size, specific zone or section design, position on the liquid distributor surface, etc. In addition, the liquid distribution apertures or holes 414 may be organized in regular or irregular arrays. The liquid distribution apertures or holes 414 may be placed at the bottom of the distributor body or at the trough vertical walls, etc.

Droplets 418 form at the liquid distribution apertures or holes 414 of the liquid distributor 410 and the droplets 418 fall from the liquid distributor 410 through the spacing 408 creating streams of droplets 418 or liquid streams. In general, the liquid streams or droplets 418 created may vary in size and may have different initial velocities. The droplet 418 sizes are defined by the diameter of the liquid distribution apertures or holes 414, by the liquid initial velocity, and by the liquid physical properties (density viscosity, etc.).

The packing 404 is designed to accept the liquid 416 from the liquid distributor 410 and to distribute the ascending vapor stream 420 evenly across the cross-section of the mass transfer column section 400. Risers 412 are positioned across the surface of the liquid distributor 410 to allow the ascending vapor stream 420 to flow through and into, for example, the next mass transfer column section (not shown).

Since the turning vapor stream 422 was found to impact the droplet 418 and its intended trajectory, and because it is not always possible to minimize the spacing 408 between the packing 404 and the liquid distributor 410, Applicants sought to force the ascending vapor streams 420 to turn closer to the packing surface 406 rather than closer to the liquid distributor 410. The device used to achieve this purpose shall be referred to as a shield wall or shield 424.

A shield 424 is affixed to the bottom of the liquid distributor 410 where the shield 424 extends downward in the direction opposite of the ascending vapor stream 420. Applicants found that incorporation of the shield 424 caused the ascending vapor stream 420 to maneuver towards the open area of the riser 412 (i.e., become a turning vapor stream 422) at a position closer to the surface of the packing 406 and further away from the point at which the droplet 418 enters the spacing 408 from the aperture or hole 414 in the liquid distributor 410 as illustrated in FIG. 4. Applicants found that the shield 424 caused the area between the shield 424 and, for example, the outer wall of the mass transfer column 402 where the droplets 418 fell, to become a static pressure zone with low vapor velocity, resulting in the turning vapor stream 422 to form at a position much closer to the surface of the packing 406. Thus, the droplets 418 fall through the spacing 408 for a much longer period of time and distance without being affected by the turning vapor streams 422 leading to (1) less deflection of the droplets 418 (2) better distribution of the liquid 416; and (3) better mass transfer efficiencies of the mass transfer column section 400. Shield 424 extends sufficiently below the level of liquid distributor 410 to reduce the affected droplet residence time (ADRT).

For exemplary purposes, one may assume the $H_{AFFECTED}$ (or the spacing where the droplets are affected by the turning vapors streams) of FIG. 2 is equal to the distance between the bottom surface 126 of the liquid distributor 110 and the top surface 106 of the packing 104 to be 400 mm and the average droplet velocity of 1 m/sec. Thus, the affected droplet residence time is calculated as 0.4 sec. Use of shield 424 in the mass transfer column section 400 dramatically reduces the affected droplet residence time. As illustrated in FIG. 4, the $H_{AFFECTED}$ (or the spacing where the droplets are affected by the turning vapors streams) is equal to the distance between the bottom surface 428 of the shield 424 and the packing surface 406. The affected droplet residence time (ADRT) will be 0.04 seconds where the $H_{AFFECTED}$ is 40 mm and the average droplet velocity of 1 m/sec.

The affected droplet residence time (ADRT) is reduced by an order of magnitude by installation of the shield 424 near riser 412 to delay the influence of turning vapor stream 422 on the falling droplets 418 leading to smaller deflection of droplet 418 from their intended fall position on packing surface 406.

Importantly, in the exemplary mass transfer column sections 100, 400 illustrated in FIGS. 2 and 4, the total liquid residence time changed very little and only the affected droplet residence time is reduced. The total liquid residence time (TLRT) is calculated based on the height of the spacing 108, 408 (irrespective of the shield 424) and the average velocity of droplet 118, 418 in the spacing 108, 408 respectively.

Figure 5:
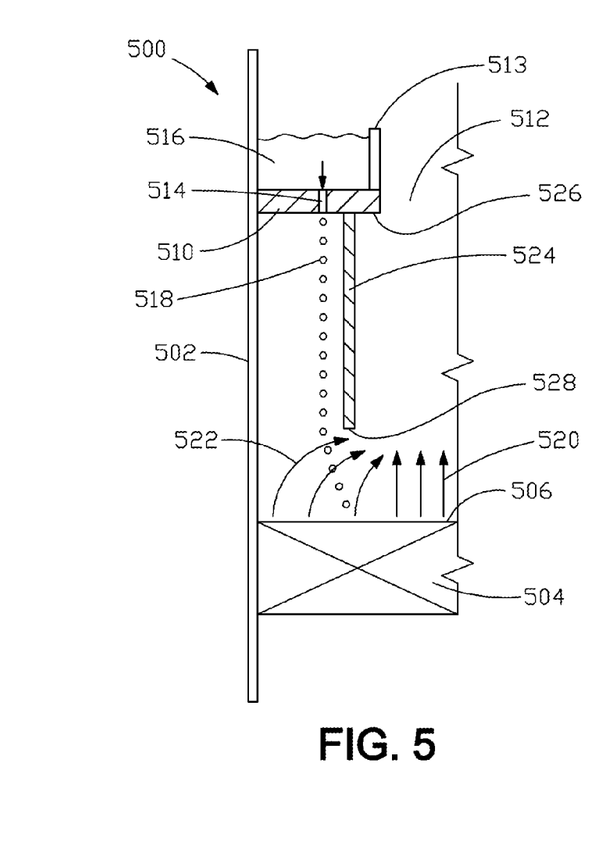
FIG. 5 is a sectional view of a mass transfer column section in accordance with one embodiment of the present invention.

The shield 424 may be positioned directly below a riser wall 413 as illustrated in FIG. 4 (i.e., as a continuation of the riser wall 413) or in any other suitable manner including offset from the riser wall 513 as illustrated in FIG. 5. For exemplary purposes, shield 424 illustrated in FIG. 4 and shield 524 illustrated in FIG. 5 have the same shield length. The deflection of droplets 418, 518 may be different due to the positions of shield 424, 524. In FIG. 5, liquid distribution apertures or holes 514, and therefore the position where the droplets 518 form, are positioned closer to shield 524 and, therefore, the turning vapor stream 522 may act on droplets 518 with a greater force. At the same time, the enlarged open area under riser 512 may reduce the velocity of the turning vapor stream 522 and therefore, may reduce the force acting on droplets 518. The final result may be an acceptable deflection since the affected droplet residence time (ADRT) remains small. Thus, in general, shield 524 may be positioned anywhere between liquid distribution apertures or holes 514 and riser 512.

Figure 6A:
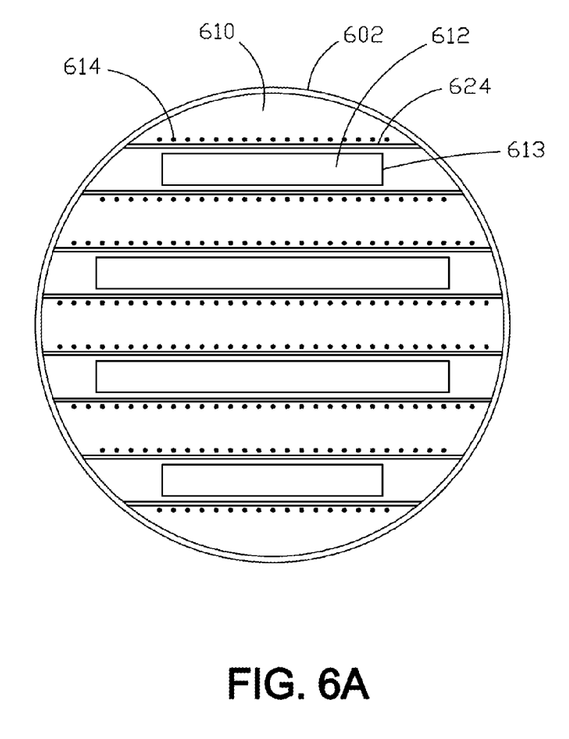
FIG. 6A is a cross-sectional view of a liquid distributor in accordance with one embodiment of the present invention.
Figure 6B:
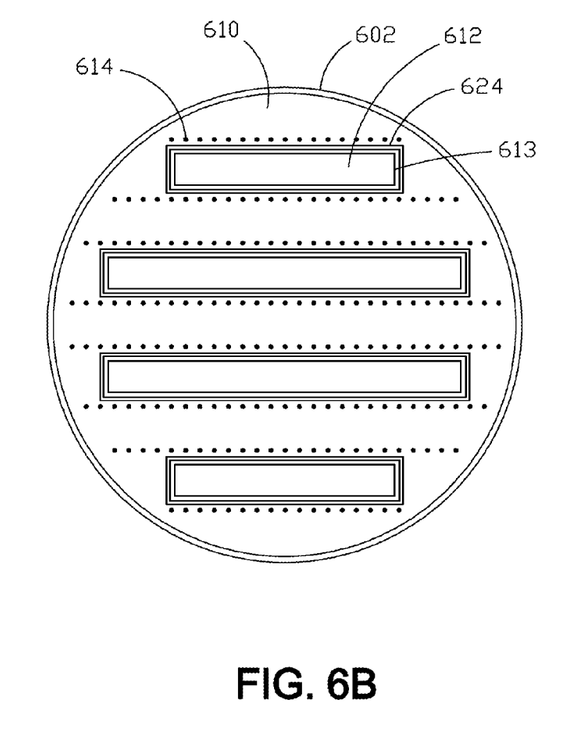
FIG. 6B is a cross-sectional view of a liquid distributor in accordance with one embodiment of the present invention.
Figure 6C:
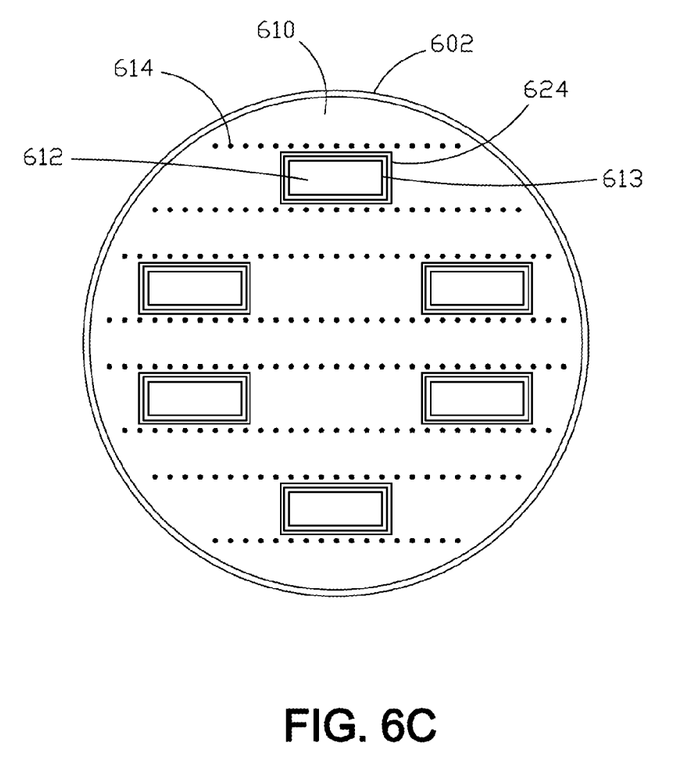
FIG. 6C is a cross-sectional view of a liquid distributor in accordance with one embodiment of the present invention.
Figure 7:
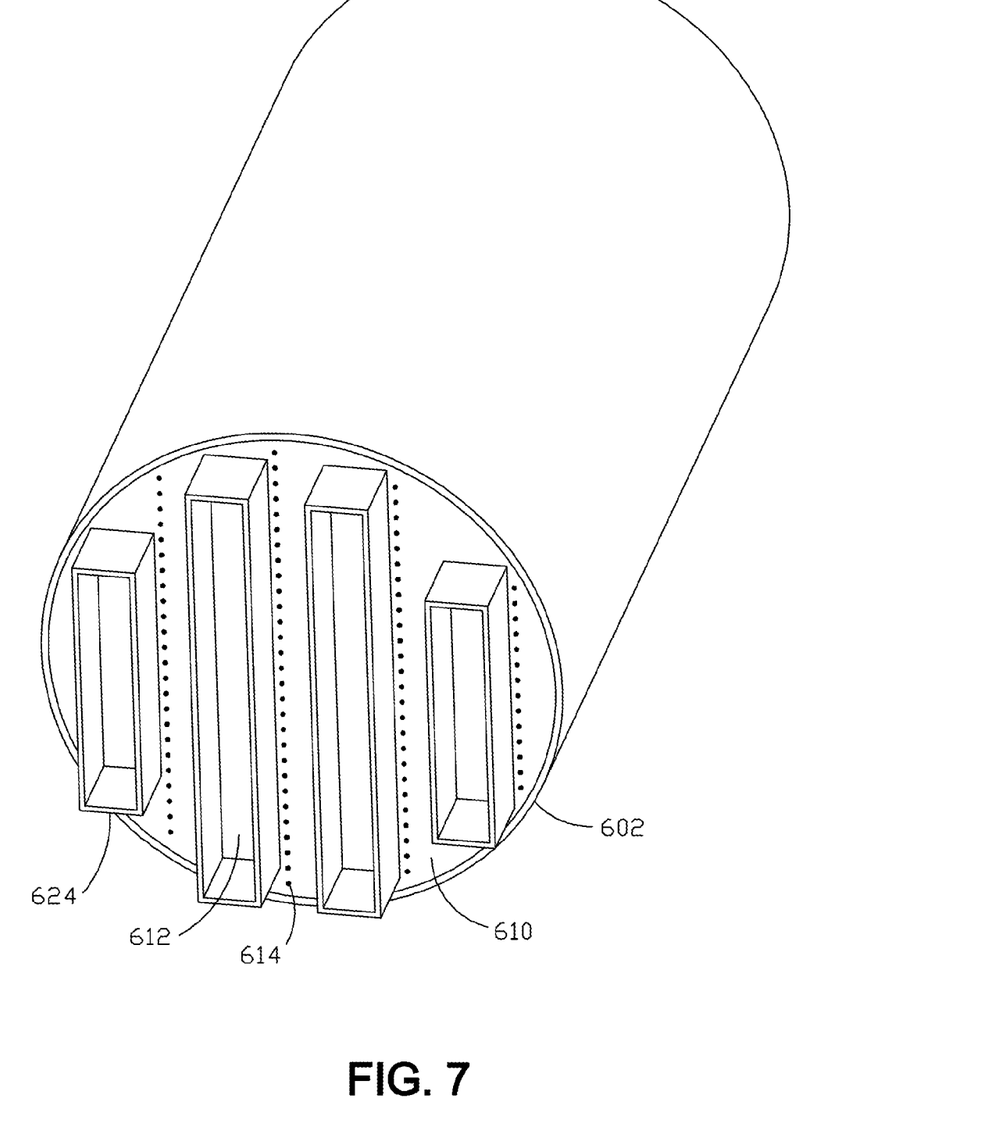
FIG. 7 is a perspective view of a liquid distributor in accordance with one aspect of the present invention.

The shields 624 may extend along the entire length of the cross-section of the column where one shield 624 is used in conjunction with multiple risers 612 as illustrated in FIG. 6A. The shields 624 may also have a box shape that is wrapped around a riser 612 as illustrated in FIG. 6B. Partial shields 624 may also be used in some cases as illustrated in FIG. 6C. A partial shield is a shield 624 which covers a specific riser 612 without extending all the way across the column. In some instances, a mixture of one more of the alternatives illustrated in FIGS. 6A to 6C may be used. For example, the shield may extend only the length of the riser, but would not wrap around the ends of the riser. In other instances, a column designer may choose to extend the shield along the risers or reduce the shield length to the size smaller then the riser length. Any other desirable and suitable shape/orientation of the shield may be used to accomplish the purpose.

Reference numerals of some elements of the mass transfer column 102 that are also present in mass transfer columns 402, 502 and 602 but are not specifically discussed in the specification are, in the interest of clarity, may be included in FIGS. 4 through 7. Such elements will have reference numbers that are increased by 300, 400 or 500, respectively. For example, the liquid distributor is identified by reference numeral 110 in reference to mass transfer column 102. Reference numerals 410, 510 and 610 refer to mass transfer columns 402, 502 and 602, respectfully.

EXAMPLES

The effect of the vapor flow on liquid trajectory was evaluated using both theoretical and experimental means. A mathematical model was built to evaluate possible droplet deflection in the spacing of a column zone. This model was built using computational fluid dynamics (CFD) techniques. Commercially available code FLUENT was used to construct the model. The liquid deflection was calculated as a function of the vapor velocity as illustrated in FIG. 3. Modeling predictions were validated by the results obtained from conducting the experiments using air and water. An agreement between modeling and experimental results was found.

As illustrated in FIG. 3 and Table 1, substantial liquid deflection may occur when the vapor velocity of the ascending vapor is relatively high.

TABLE 1

| Relative Vapor Velocity % | Relative Liquid Velocity | Liquid Deflection (without shields) mm |
|---|---|---|
| 42% | 0.7 | 19.5 |
| 58% | 0.7 | 39.6 |
| 78% | 0.7 | — |
| 42% | 1.5 | 10.4 |
| 58% | 1.5 | 20.2 |
| 78% | 1.5 | 39.3 |

Liquid deflection at a relative vapor velocity of 78% and a relative liquid velocity of 0.7 was not included in Table 1 because at such relative vapor and liquid velocities, the deflection was so great that the liquid deflected into other deflected liquid streams (coming from the other direction) in the same section causing inaccurate measurement of the liquid deflection. However, the liquid deflection at the relative vapor velocity of 78% and relative liquid velocity of 0.7 was greater than the liquid deflection at the relative vapor velocity of 58% and relative liquid velocity of 0.7. Applicants found that liquid deflection may be reduced if the initial velocity of the liquid droplets is increased. Nevertheless, the liquid deflection may be quite substantial even with a relatively high initial liquid velocity.

For example, a liquid droplet may be deflected nearly 36 mm from the desired vertical fall position when the vapor velocity is increased by approximately seventy-five percent (75%) as illustrated in FIG. 3. FIG. 3 also illustrates that the droplet deflection may exist even at relatively low vapor velocity, but the maldistribution caused by such deflection may be tolerable for practical/commercial purposes.

Evaluation of liquid deflection in a single column zone revealed that the most influential parameter of liquid deflection was the residence time of the droplet in the spacing between the packing surface and the distributor. The residence time, however, may not be as important if the droplet is not experiencing a significant force from the ascending vapors (or more specifically the turning vapor streams). The low flow rate region illustrated in FIG. 3 exemplifies this fact. At sufficiently high vapor flow rates, the affected droplet residence time (ADRT) became the most influential factor, resulting in greater deflection as the residence time increased. Minimizing the affected droplet residence time helped to minimize the deflection of the droplet from the desired position on the packing surface.

Figure 8:
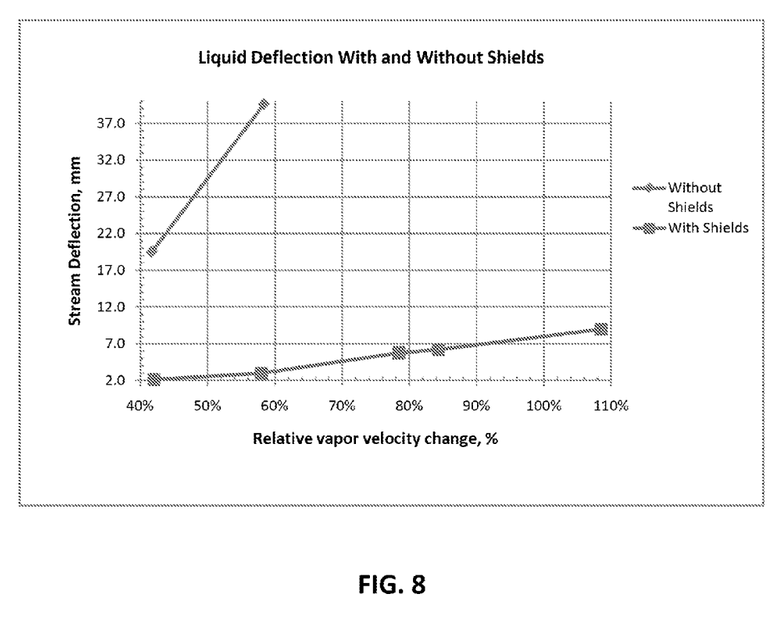
FIG. 8 is a graphical representation illustrating liquid deflection with and without shield incorporated at various relative vapor velocity changes.

Table 2 in conjunction with FIG. 8 illustrates the differences in liquid deflection in the mass transfer column of FIG. 3 without a shield and a similar mass transfer column incorporated with a shield where again the relative liquid velocity remained constant and the relative vapor velocity was increased.

TABLE 2

| Relative Vapor Velocity m/s | Relative Liquid Velocity m/s | Deflection Without Shields mm | Deflection With Shields mm |
|---|---|---|---|
| 42% | 0.7 | 19.5 | 2.1 |
| 58% | 0.7 | 39.6 | 3.0 |
| 78% | 0.7 | — | 5.8 |
| 84% | 0.7 | — | 6.2 |
| 108% | 0.7 | — | 9.0 |

As illustrated in Table 2 and FIG. 8, inclusion of the shield in the mass transfer column section dramatically reduced the liquid deflection in the column section thereby leading to higher mass transfer efficiency.

The "gap" (i.e., the distance between the bottom surface 428 of shield 424 and the packing surface 406) may vary for different columns, different zones in the same column, and even for different risers in the same column section. The size of the gap depends on many factors including, but not limited to, the particular column design, vapor and liquid flow rates, size of spacing between the packing surfaces and the distributors, distributor liquid aperture or hole sizes, riser positions and dimensions, etc. Generally, a gap of more than 75 mm is less efficient and may not provide sufficient deflection control due to the increased affected droplet residence time ADRT. A gap of 10 mm or less may lead to high velocities of the turning vapor stream 422 in the gap between shield 424 and packing surface 406. The high velocity turning vapor stream 422 may cause unacceptable deflections even though the calculated affected droplet residence time (ADRT) is small. A gap of 10 mm or less may also impact uniformity of vapor distribution in the packing 404. The preferred gap is in the range between 10 mm and 75 mm, and more preferably between 40 mm and 50 mm. An appropriate shield height should be chosen to accommodate the preferred gap. Table 3 and FIG. 9 illustrate the liquid deflection for different size gaps where the relative liquid velocity remained constant and the relative vapor velocity was increased.

TABLE 3

| Relative Vapor Velocity | Relative Liquid Velocity | Droplet Deflection (mm) | | |
|---|---|---|---|---|
| | | 10 mm gap | 50 mm gap | 75 mm gap |
| 78% | 0.7 | 4.8 | 5.8 | 7.9 |
| 84% | 0.7 | 5.8 | 6.2 | 9.1 |
| 108% | 0.7 | 6.5 | 9.0 | 13.7 |

Figure 9:
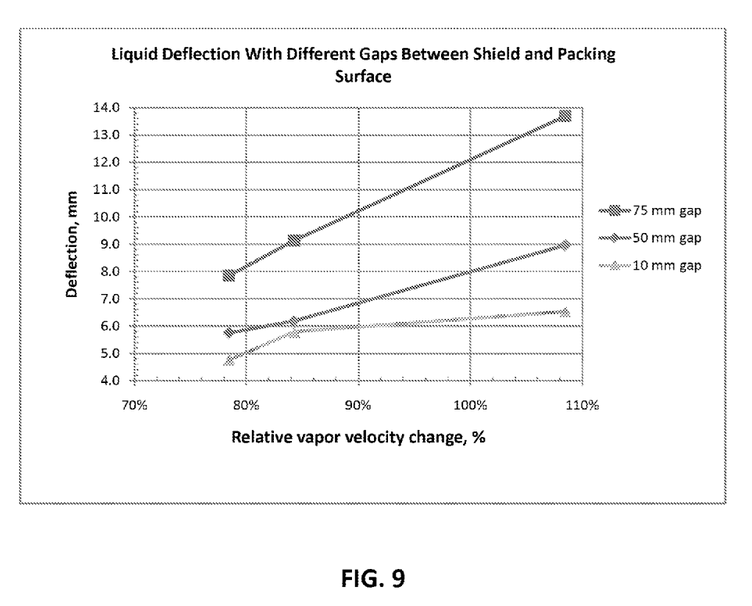
FIG. 9 is a graphical representation illustrating liquid deflection with different gaps between the shield and packing surface at various relative vapor velocity changes.

Table 3 in conjunction with FIG. 9 illustrates that as the gap was decreased by increasing the length of the shield, the liquid deflection also decreased, thus improving the mass transfer column efficiency.

While aspects of the present invention have been described in connection with the preferred embodiments of the various figures, it is to be understood that other similar embodiments may be used or modifications and additions may be made to the described embodiment for performing the same function of the present invention without deviating therefrom. The claimed invention, therefore, should not be limited to any single embodiment, but rather should be construed in breadth and scope in accordance with the appended claims. For example, the following aspects should also be understood to be a part of this disclosure:

Aspect 1. A liquid distributor for distribution of a liquid in a mass transfer column, comprising: at least one riser comprising at least one riser wall, wherein the at least one riser wall extends from a first surface of the liquid distributor in a first direction of the mass transfer column; at least one shield, wherein the at least one shield extends from a second surface of the liquid distributor opposite the first surface and extending in a second direction of the mass transfer column opposite the first direction; and at least one liquid distribution aperture extending from the first surface of the liquid distributor through the second surface of the liquid distributor, wherein the at least one shield has a length extending in the second direction such that a gap is created between the at least one shield and a packing, and wherein the height of the gap between the shield and the packing is about 10 mm to 75 mm.

Aspect 2. The liquid distributor of Aspect 1, wherein the mass transfer column is an air separation column.

Aspect 3. The liquid distributor of Aspect 1 or Aspect 2, wherein the packing is structured packing.

Aspect 4. The liquid distributor of any one of Aspects 1 to Aspect 3, wherein the height of the gap between the shield and the packing is about 40 mm to 50 mm.

Aspect 5. The liquid distributor of any one of Aspects 1 to Aspect 4, wherein the at least one shield is positioned such that the at least one shield extends from the second surface equidistant from the at least one liquid distribution aperture and the at least one riser.

Aspect 6. The liquid distributor of any one of Aspects 1 to Aspect 4, wherein the at least one shield is positioned such that the at least one shield extends from the second surface directly adjacent to the at least one riser.

Aspect 7. The liquid distributor of any one of Aspects 1 to Aspect 6, wherein the at least one riser extends substantially across the entire cross-section of the mass transfer column in a third direction perpendicular to the first direction and the second direction, and wherein the at least one shield extends across the entire cross-section of the mass transfer column in the third direction.

Aspect 8. The liquid distributor of any one of Aspects 1 to Aspect 6, wherein the at least one riser extends substantially across the entire cross-section of the mass transfer column in a third direction perpendicular to the first direction and the second direction, and wherein the at least one shield extends substantially across the entire cross-section of the mass transfer column in the third direction.

Aspect 9. A method for the distribution of a liquid in a mass transfer column, comprising the steps of:
a. introducing the liquid into an upper portion of the mass transfer column;
b. positioning within the mass transfer column as least one mass transfer column section;
c. positioning within the at least one mass transfer column section a liquid distributor to receive a downwardly flowing stream of liquid and an upwardly flowing stream of vapor, the liquid distributor comprising:
  i. at least one riser comprising at least one riser wall, wherein the at least one riser wall extends upwardly from a first surface of the liquid distributor;
  ii. at least one shield, wherein the at least one shield extends from a second surface of the liquid distributor opposite the first surface and extending downwardly; and
  iii. at least one liquid distribution aperture extending from the first surface of the liquid distributor through the second surface of the liquid distributor,
    wherein the at least one shield has a length extending downwardly such that a gap is created between the at least one shield and a packing positioned below the liquid distributor in the mass transfer column, and wherein the height of the gap between the shield and the packing is about 10 mm to 75 mm,
d. collecting the downwardly flowing stream of liquid from the upper portion of the mass transfer column on the first surface of the liquid distributor;
e. passing the upwardly flowing stream of vapor from the lower portion of the mass transfer column through the risers of the liquid distributor; and
f. distributing the downwardly flowing stream of liquid from at least one liquid distribution aperture in the liquid distributor on to the packing.

Aspect 10. The method of Aspect 9, wherein the mass transfer column is an air separation column.

Aspect 11. The method of Aspect 9 or Aspect 10, wherein the packing is structured packing.

Aspect 12. The method of any one of Aspects 9 to Aspect 11, wherein the height of the gap between the shield and the packing is about 40 mm to 50 mm.

Aspect 13. The method of any one of Aspects 9 to Aspect 12, wherein the at least one shield is positioned such that the at least one shield extends from the second surface equidistant from the at least one liquid distribution aperture and the at least one riser.

Aspect 14. The method of any one of Aspects 9 to Aspect 12, wherein the at least one shield is positioned such that the at least one shield extends from the second surface directly adjacent to the at least one riser.

The claimed invention, therefore, should not be limited to any single embodiment or aspect, but rather should be construed in breadth and scope in accordance with the appended claims.

The invention claimed is:

1. A liquid distributor having at least two adjacent channels for distribution of a liquid to a packing spaced apart from and located below the liquid distributor in a mass transfer column, comprising:
    at least one riser comprising at least one riser wall, wherein the at least one riser wall extends from a first surface of the liquid distributor in a first direction of the mass transfer column;
    at least one shield, wherein the at least one shield extends from a second surface of the liquid distributor opposite the first surface and extending in a second direction of the mass transfer column opposite the first direction; and
    at least two spaced apart rows of liquid distribution apertures in each of the two adjacent channels, each of said rows extending substantially across a channel length and each of said liquid distribution apertures extending from the first surface of the liquid distributor through the second surface of the liquid distributor,
    wherein the at least one shield has a length extending in the second direction such that a gap is created between the at least one shield and the packing, and wherein the height of the gap between the shield and the packing is about 10 mm to 75 mm; and
    wherein the liquid distributor comprises a trough style or plate style distributor.

2. The liquid distributor of claim 1, wherein the mass transfer column is an air separation column.

3. The liquid distributor of claim 1, wherein the packing is structured packing.

4. The liquid distributor of claim 1, wherein the height of the gap between the shield and the packing is about 40 mm to 50 mm.

5. The liquid distributor of claim 1, wherein the at least one shield is positioned such that the at least one shield extends from the second surface equidistant from the at least one liquid distribution aperture and the at least one riser.

6. The liquid distributor of claim 1, wherein the at least one shield is positioned such that the at least one shield extends from the second surface directly adjacent to the at least one riser.

7. The liquid distributor of claim 1, wherein the at least one riser extends substantially across the entire cross-section of the mass transfer column in a third direction perpendicular to the first direction and the second direction, and wherein the at least one shield extends across the entire cross-section of the mass transfer column in the third direction.

8. The liquid distributor of claim 1, wherein the at least one riser extends substantially across the entire cross-section of the mass transfer column in a third direction perpendicular to the first direction and the second direction, and wherein the at least one shield extends substantially across the entire cross-section of the mass transfer column in the third direction.

* * * * *